(12) United States Patent
Kuo

(10) Patent No.: US 6,409,336 B1
(45) Date of Patent: Jun. 25, 2002

(54) ADJUSTABLE GLASSES FOOT

(76) Inventor: Yao-Ling Kuo, B1, No. 104, Lee Ming Rd., Shin Diann (TW)

( * ) Notice: Subject to any disclaimer, the term of this patent is extended or adjusted under 35 U.S.C. 154(b) by 0 days.

(21) Appl. No.: 09/888,477

(22) Filed: Jun. 26, 2001

(51) Int. Cl.[7] ................................................ G02C 5/20
(52) U.S. Cl. ........................ 351/118; 351/111; 351/119
(58) Field of Search ................................. 351/118, 119, 351/120, 111, 41

(56) References Cited

U.S. PATENT DOCUMENTS 4,955,708 A * 9/1990 Kahaney ..................... 351/118
6,322,211 B1 * 11/2001 Desy .......................... 351/118

* cited by examiner

Primary Examiner—Hung Xuan Dang
(74) Attorney, Agent, or Firm—Rosenberg, Klein & Lee

(57) ABSTRACT

An adjustable glasses foot is formed by a first foot section connected to a second foot section. Wherein, the front end of the first foot section is connected with a glass frame. The first foot section further comprises a sleeve at its rear end and a space connected to the sleeve. The first foot section also comprises elastic members at least on one side of the space and locating holes on the other side opposing the elastic members. The second foot section has a rod at its front end with studs protruding therefrom. When the rod is inserted into the sleeve, the studs will be urged by the elastic members to extend through the holes to secure the second foot section and the first foot section together.

2 Claims, 7 Drawing Sheets

ADJUSTABLE GLASSES FOOT

BACKGROUND OF THE INVENTION

1. Field of the Invention

This invention relates to an adjustable glasses foot, and more particularly to a fixed structure of a pair of adjustable feet coordinating with the shape and the thickness of the glasses frame.

2. Description of Prior Art

Conventional glasses frames all have their two feet in a fixed length, which can not be adjusted to fit owner's outfit, and the feet will be replaced by a new parts.

Adjustable glasses feet are invented, later on, which are able to adjust their length for different wearers.

SUMMARY OBJECT OF THE PRESENT INVENTION

It is the primary object of the present invention to provide an adjustable glasses foot, which is easy to adjust.

It is another object of the present invention to provide an adjustable glasses foot, which is a one size to fit all.

It is a further object of the present invention to provide an adjustable glasses foot, which is inexpensive to manufacture.

DETAILED DESCRIPTION OF THE PREFERRED EMBODIMENT

Figure 1:
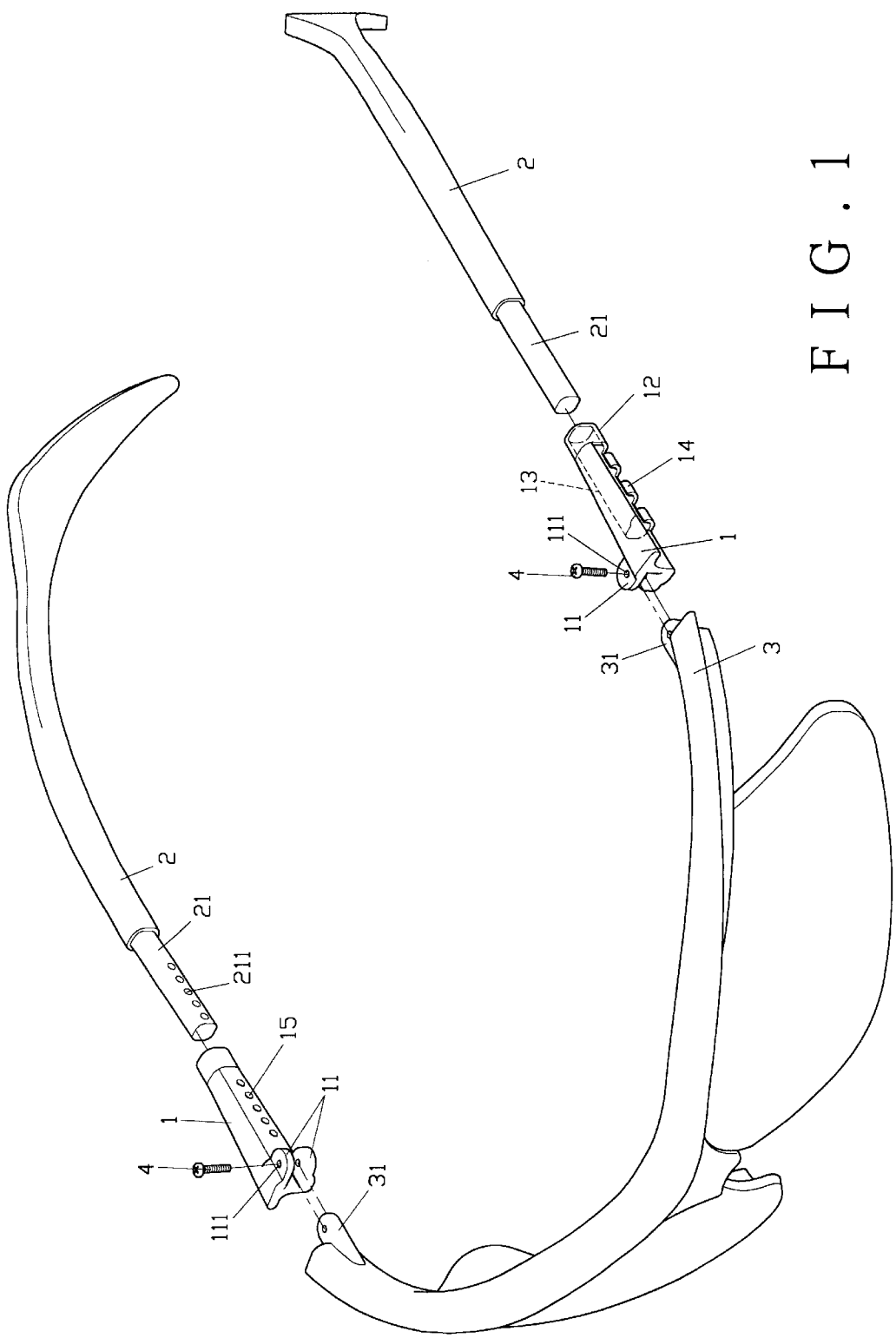
FIG. 1 is an exploded view of the present invention.

As shown in FIG. 1, an adjustable glasses foot comprises a first foot section 1 connected to a second foot section 2.

The first foot section 1 comprises a pair of lugs 11 at the front end with threaded holes 111 thereat to be secured to a seat 31 of a frame 3 by fasteners 4. The first foot section 1 further comprises a sleeve 12 at its rear end and a space 13 connected to the inner hole of the sleeve 12. The space 13 is designed to coordinate with the shape of the glasses frame 3 or the thickness of the first foot section 1 so that the first foot section 1 and the glass frame 3 has an integral appearance. The first foot section 1 further comprises a few of elastic members 14 (elastic hook type, as shown in FIG. 1) at one side of the space 13 and a few locating holes 15 at the other side of the space 16.

The second foot section 2 has an insertion rod 21 relative to the space 13 of the first foot section 1 with a few of studs 211 extending outwardly relative to the locating holes 15.

Figure 2:
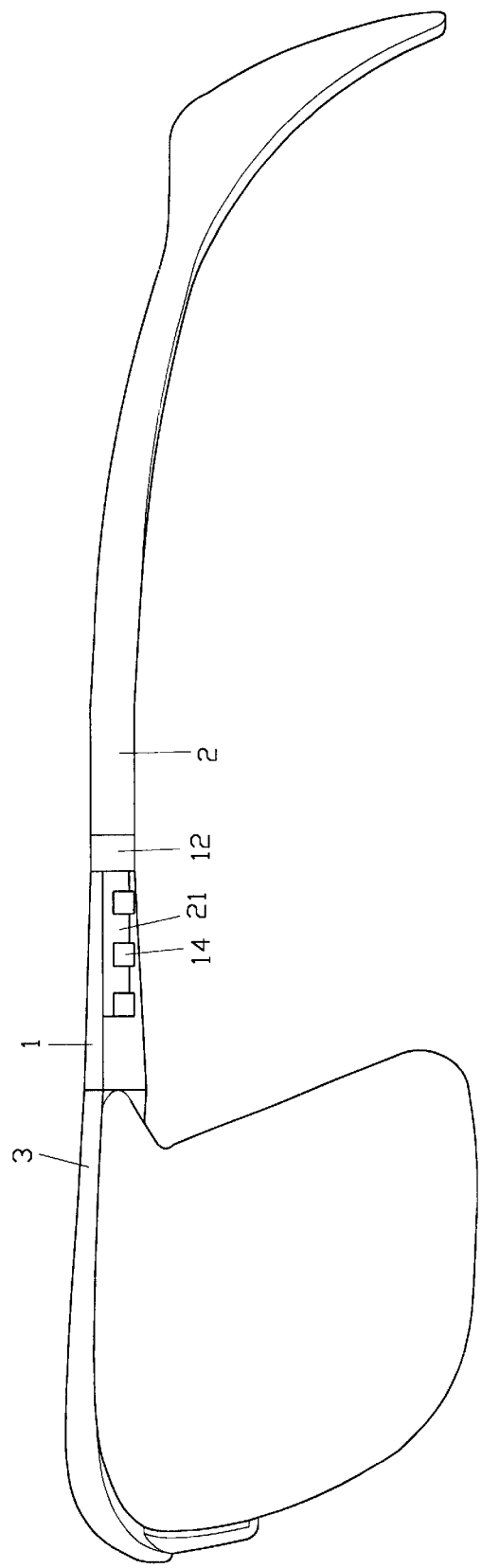
FIG. 2 is a first section view of the present invention.
Figure 3:
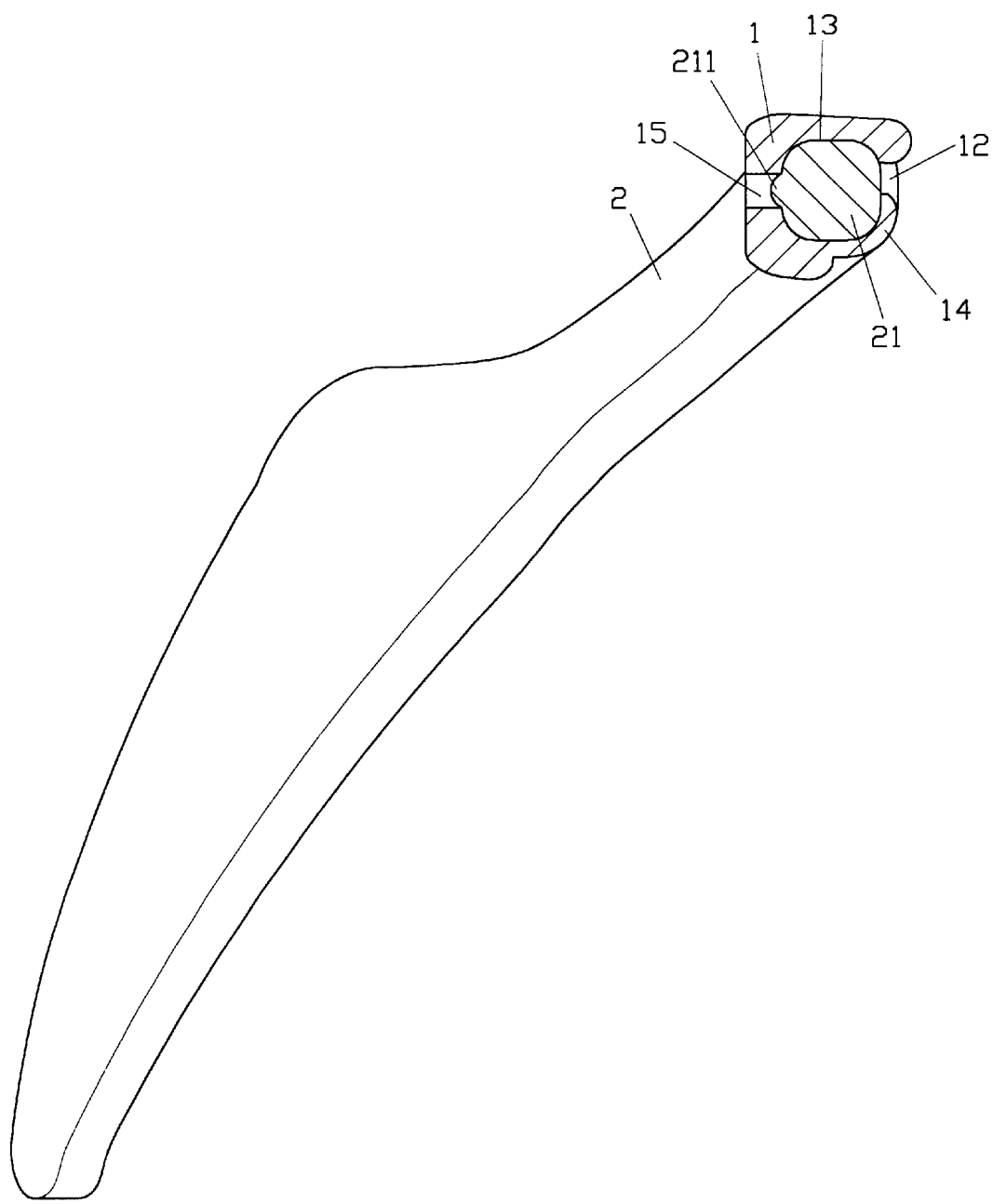
FIG. 3 is a second section view of the present invention.

To assemble the present invention, as shown in FIGS. 2 and 3, the insertion rod 21 of the second foot section 2 is inserted into the sleeve 12 until the insertion rod 21 has reached to the space 13, whereas the elastic members 14 will engage with the insertion rod 21 that urges the studs 211 to extend outwardly from the locating holes 15 to keep the second foot section 2 securely attached to the first foot section 1. To adjust the length of the feet, simply pull or push the second foot section 2 with respect to the first foot section 1, and the elastic members 14 will retreat so that the studs 211 may be slid within the locating holes 15.

Figure 4:
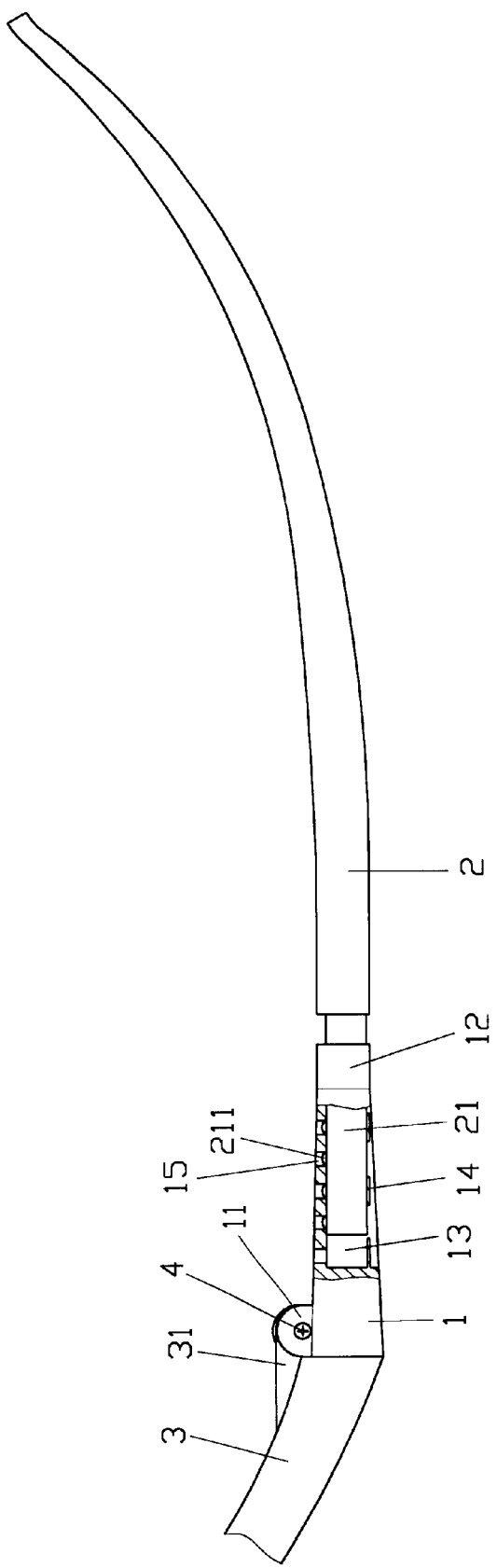
FIG. 4 is a view showing adjustment of the length of the feet.

When pulling the second foot section 2 from the first foot section 1, the studs 211 of the insertion rod 21 will deform slightly, so as the elastic members 14 will retreat, as shown in FIG. 4, until the studs 211 have reached to the desired locating holes 15.

Figure 5:
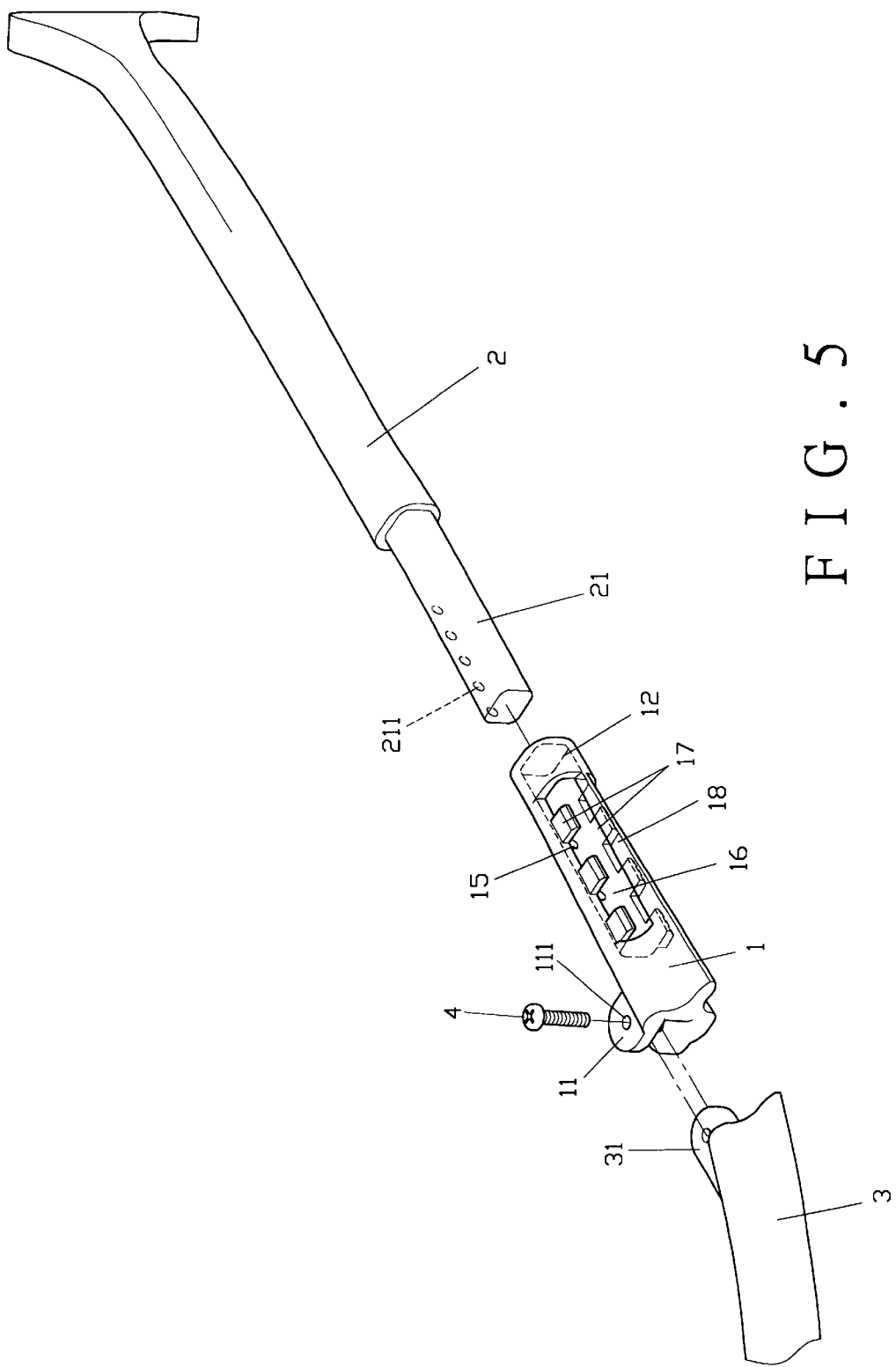
FIG. 5 is a second embodiment of the present invention.
Figure 6:
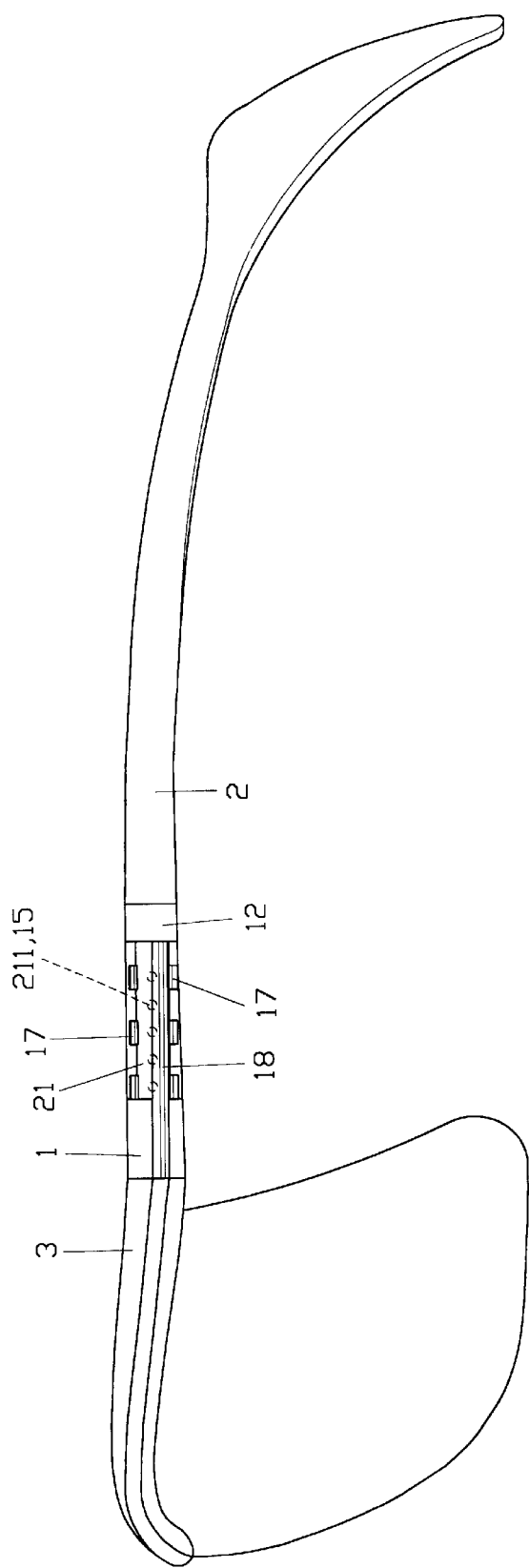
FIG. 6 is a first sectional view of FIG. 5.
Figure 7:
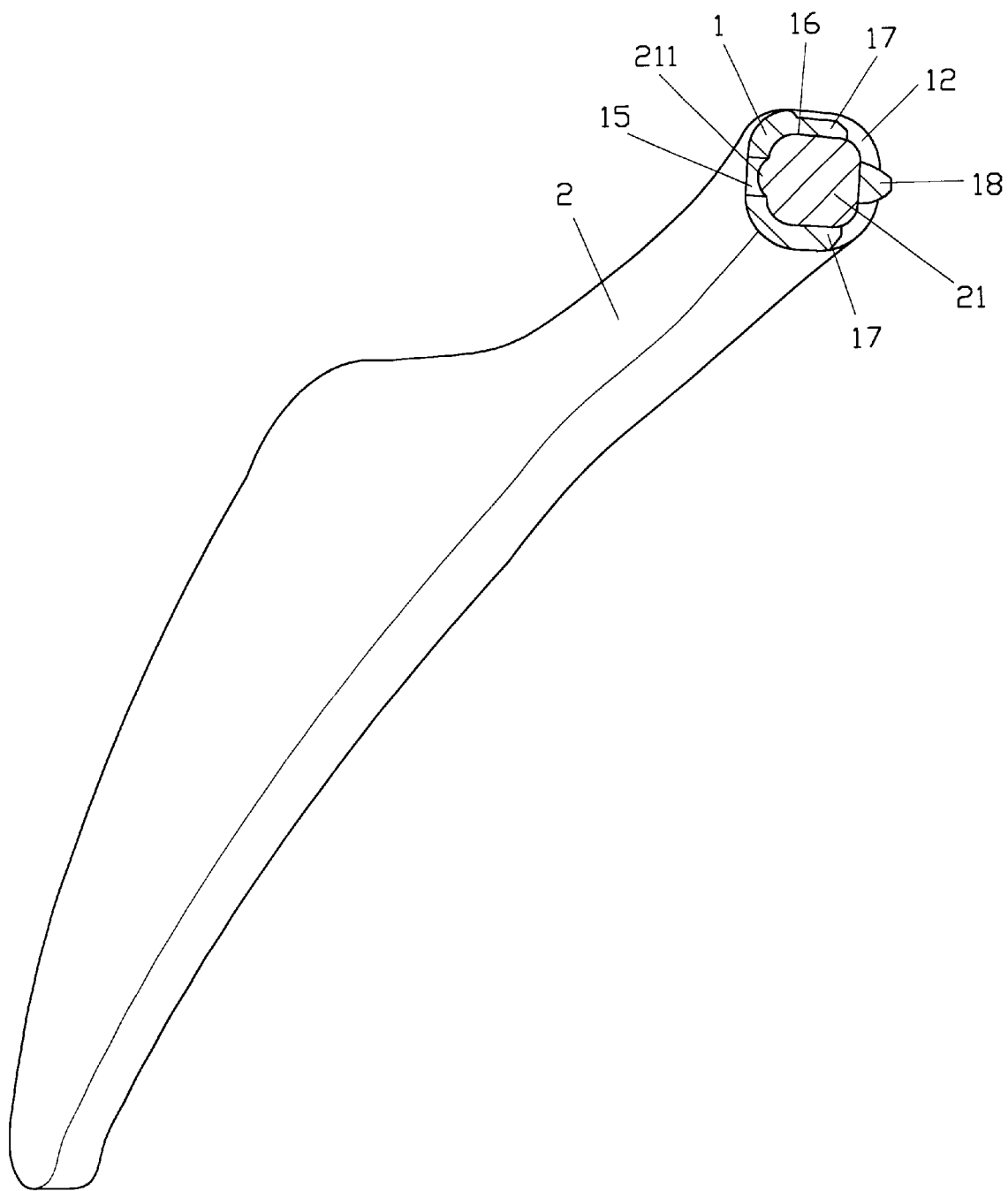
FIG. 7 is a second sectional view of FIG. 5.

FIG. 5 shows a second embodiment of the present invention. A space 16 is formed at inside of first foot section 1 connected to the inner hole of the sleeve 12. The first foot section 1 comprises a number of elastic members 17 (elastic projection type) on the inner top and bottom of the space 16 and a strip 18 crossing the outside of the space 16. As shown in FIGS. 6 and 7, when the insertion rod 21 of the second foot section 2 is inserted into the first foot section 1, the insertion rod 21 will be stuck into the space 16 and engaged with the elastic members 17 to secure at place. Whereas the strip 18 will engage with the side of the insertion rod 21, thus, the studs 211 of the insertion rod 21 are urged to extend through the locating holes 15.

I claim:

1. An adjustable glasses foot comprising a first foot section and a second foot section, a front end of said first foot section being connected to a glasses frame, and the improvements comprising:

said first foot section being formed with a sleeve at a rear end and a space connecting with said sleeve, said first foot section having elastic members on one side of said space, and locating holes on the other side of said space;

said second foot section having an insertion rod at a front end relative to said sleeve and said space, a few of studs extending outwardly from one side of said insertion rod relative to said locating holes;

thus, said insertion rod of said second foot section being inserted into said sleeve and said space of said first foot section, said studs of said insertion rod extending from said locating holes of said space and being secured by said elastic members therein.

2. The adjustable glasses foot as recited in claim 1, wherein said first foot section further comprises a strip crossing the outside of said space and corresponding to said elastic members.

* * * * *